United States Patent [19]

Welliver

[11] 4,155,383
[45] May 22, 1979

[54] ROUTER ACCESSORY

[76] Inventor: Edward V. Welliver, 904 New Milford School Rd., Rockford, Ill. 61109

[21] Appl. No.: 862,918

[22] Filed: Dec. 21, 1977

[51] Int. Cl.² .............................................. B27C 5/10
[52] U.S. Cl. .................................. 144/134 D; 30/371; 83/471.2; 83/486.1; 83/574
[58] Field of Search .............. 144/2 R, 134 R, 134 D, 144/136 R, 136 D, 323; 83/471, 471.2, 471.3, 486, 486.1, 487, 574; 30/371

[56] References Cited

U.S. PATENT DOCUMENTS

| 1,457,492 | 6/1923 | Bloodgood | 83/574 X |
| 2,630,147 | 3/1953 | Gamberg | 83/574 |
| 2,708,463 | 5/1955 | Coleman | 83/574 |
| 2,739,624 | 3/1956 | Haddock | 83/574 X |
| 2,751,945 | 6/1956 | Beach | 144/136 C |
| 2,770,265 | 11/1956 | Pollock | 83/574 X |
| 2,818,892 | 1/1958 | Price | 83/574 |
| 2,911,017 | 11/1959 | Holder | 83/486.1 X |
| 3,384,135 | 5/1968 | Frydenlund | 83/471.3 |

Primary Examiner—Donald R. Schran
Assistant Examiner—W. D. Bray
Attorney, Agent, or Firm—Berman, Aisenberg & Platt

[57] ABSTRACT

An accessory for an electric router which facilitates edging, trimming, groove cutting, and the like, on small workpieces. The accessory features a two tier construction, the workpiece being positioned on a work table pivotally mounted to the lower tier, while the router is vertically mounted on the upper tier. The upper tier is vertically movable with respect to the lower tier to accommodate the workpiece therebetween. The upper tier comprises a pair of parallel guide rails along which the router may be slidably moved through the workpiece. In an alternate mode of operation, the router may be securely clamped to the guide rails and the workpiece pushed along the work table through the router bit by a safety tool.

20 Claims, 6 Drawing Figures

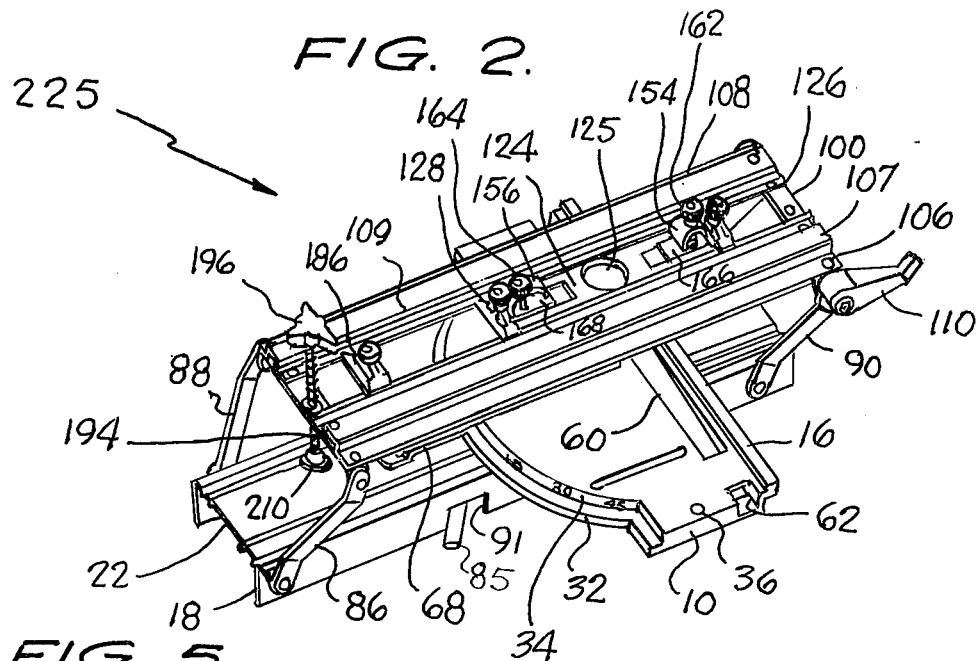
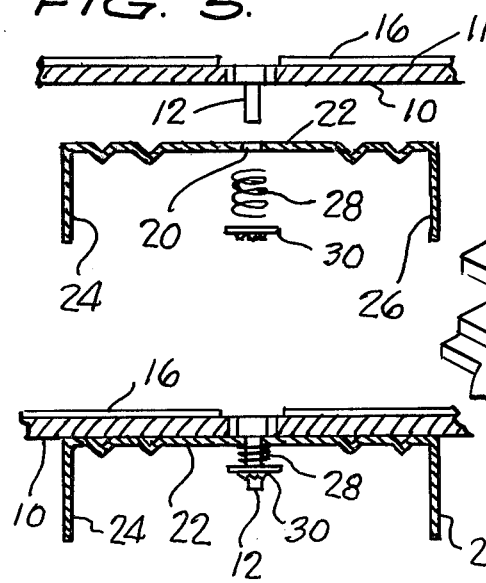
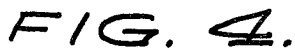
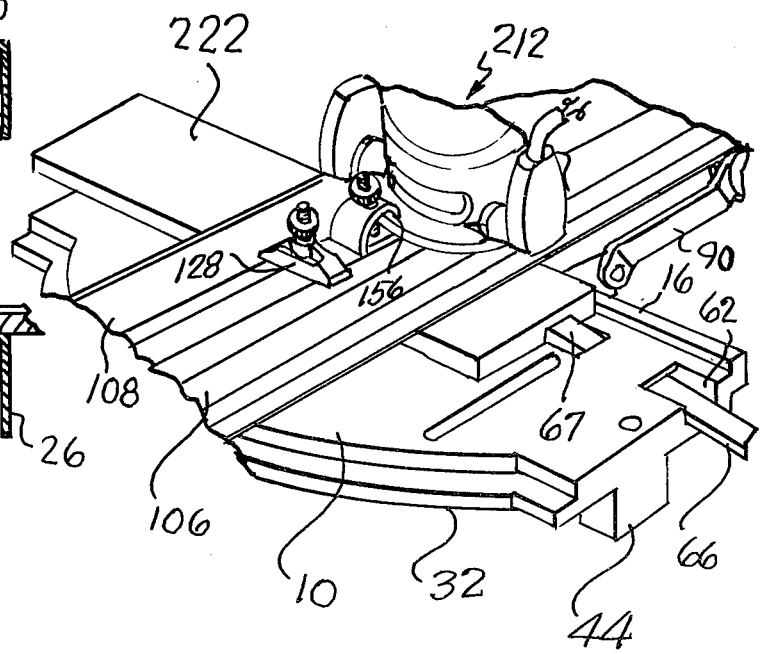

ROUTER ACCESSORY

BACKGROUND OF THE INVENTION

1. Field of The Invention

The present invention is related to power tool accessories and, more particularly, is directed towards an accessory for an electric router which greatly facilitates the use thereof.

2. Description of The Prior Art

An electric router is a conventional power tool which is commonly utilized to make molding, joints, angle cuts or trim the edges of wooden workpieces.

It requires a considerable degree of practice and skill before one can master proper operation of an electric router. Conventionally, a router must be hand-held and guided. Thus, for the novice or unskilled person, it is sometimes exceedingly frustrating to attempt to use a router to perform even the simplest of jobs.

Moreover, even an experienced carpenter using a router can make errors in cuts, since the size and weight of the router make it an inherently difficult tool to control.

Accordingly, it would be extremely advantageous if there could be provided a means for facilitating the use of an electric router which would benefit both the novice handyman as well as the skilled carpenter. It is towards this end that the present invention is advanced.

OBJECTS AND SUMMARY OF THE INVENTION

It is therefore a primary object of the present invention to provide a power tool accessory which greatly facilitates and simplifies the use of an electric router.

Another object of the present invention is to provide a novel and unique accessory adapted to be utilized in conjunction with an electric router which greatly increases the accuracy of the tool as well as the speed with which the tool may be utilized.

An additional object of the present invention is to provide a router accessory which permits an unskilled or novice handyman to utilize an electric router with great precision and speed, and which may be easily assembled to any workbench.

A still further object of the present invention is to provide a novel router accessory which is inexpensive to manufacture, easy to assemble, install and operate, and which is extremely safe in use.

The foregoing and other objects are attained in accordance with one aspect of the present invention through the provision of an accessory for an electric router, which comprises first means for supporting a workpiece to be cut by the router, second means for supporting the router and positioned over the first means, and means for adjusting the height of the second means relative to the first means. The first means includes an elongated support member, the second means includes guide rail means, and the height adjusting means includes means for maintaining the guide rail means substantially parallel to the elongated support member at all heights thereof. The height adjusting means more particularly preferably comprises bracket means which are pivotally interconnected between the elongated support member and the guide rail means. More specifically, the bracket means comprises four elongated brackets, each of which is pivotally mounted at one end thereof to the elongated support member and at the other end thereof to the guide rail means. A handle is preferably connected to one of the upper ends of the bracket for facilitating movement of the guide rail means relative to the elongated support member.

In accordance with more specific aspects of the present invention, the guide rail means comprises a pair of elongated, spaced, parallel guide rails which extend in a direction parallel to the elongated support member. The guide rail means further comprises means for mounting the router vertically thereon and having means for permitting passage of the bit of the router between the rails to a workpiece positioned on the support member therebelow. The means for mounting the router includes means for permitting sliding movement of the router along the parallel guide rails, as well as means for clamping the flanged base of the router thereto. A pair of adjustable clamping means are located respectively at each end of the mounting means for permitting sliding movement of the router, the adjustable clamping means being mounted to a pair of inwardly extending parallel flanges formed on the edges of the pair of guide rails. A stop member may be provided in the form of a separate, additional clamping means placed between the parallel flanges at one end thereof.

In accordance with another aspect of the present invention, the height adjusting means further includes means for limiting the height to which the guide rail means may be lowered with respect to the elongated support member. The height limiting means comprises a stop member coupled to and extending below the guide rail means a distance which corresponds to the desired height limit. More particularly, the stop member preferably comprises a threaded bolt and a lock nut for permitting adjustment of the portion of the bolt which extends below the guide rail means.

In accordance with still other aspects of the present invention, the first means for supporting a workpiece preferably comprises a lower support member and table means pivotally mounted thereto for rotation thereof in a substantially horizontal plane. A clamp means is connected to the lower support member for clamping the table means in a fixed position to prevent rotation thereof. A lever means is preferably coupled to the clamp means for selectively raising and lowering same respectively out of and into engagement with the table means. The table means includes a pivot pin and an arcuate edge which is equidistantly located from the pivot pin, the clamp means including means for selectively engaging the arcuate edge of the table means.

The table means preferably includes a substantially planar upper surface upon which the workpiece is adapted to be placed. Means are formed in the table means for securing same to a workbench therebelow whereby the upper and lower support members are pivotable with respect thereto. The planar upper surface of the table means preferably includes slot means formed therein for receiving means for clamping the workpiece thereon, and also preferably includes a ledge formed along the rear edge of the table means against which the workpiece may be positioned in use.

In accordance with yet another aspect of the present invention, the table means also includes slotted means formed therein for receiving safety means adapted to manually push the workpiece across the planar upper surface of the table. The safety means in a preferred form comprises an elongated stick, while the slotted means for receiving same is substantially parallel to the rear edge of the table means and is also inclined from its highest point at the center thereof downwardly to each of the side portions of the table means.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 2 is another perspective view of the preferred embodiment of the present invention prior to the placement of the workpiece and router thereon;

FIG. 4 is an enlarged, broken prespective view which illustrates the preferred embodiment of the present invention in a second mode of operation;

FIG. 5 is a sectional, exploded view of a preferred form of the worktable and underlying support member in accordance with the present invention; and FIG. 6 is a view similar to FIG. 5 but showing the components in their assembled condition.

DETAILED DESCRIPTION OF THE PREFERRED EMBODIMENT

Figure 1:
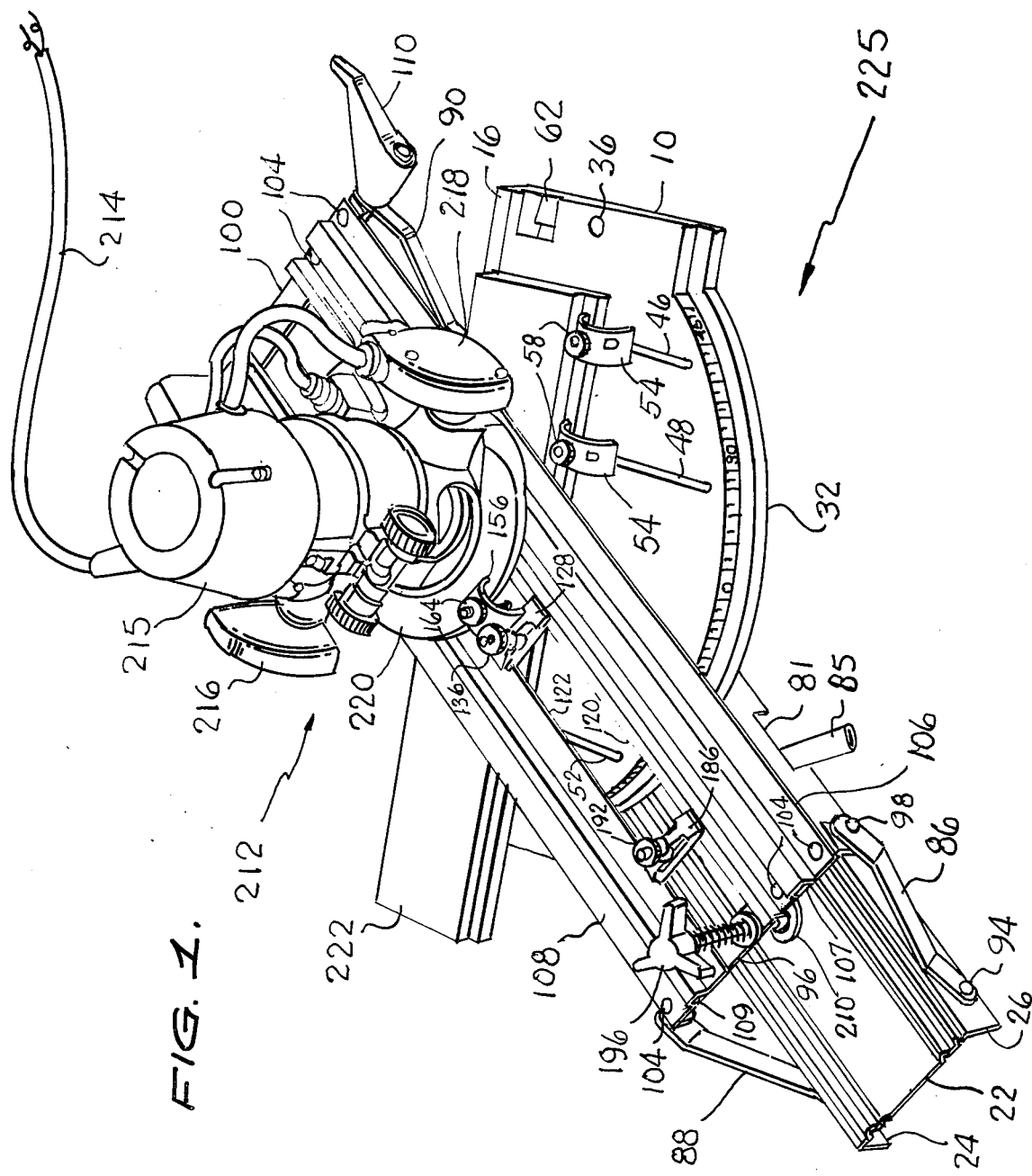
FIG. 1 is a perspective view of a preferred embodiment of the present invention during use in a first mode.

Referring now to the drawings, wherein like reference numerals indicate identical or corresponding parts throughout the several views, and more particularly to FIG. 1 thereof, a preferred embodiment of the router accessory of the present invention is indicated generally by reference numeral 225. Router accessory 225 is adapted for receiving, mounting and holding an electric router thereon, which is indicated generally by reference numeral 212. The mode of operation of the preferred embodiment of the present invention will be explained after the structure of the accessory 225 is set forth.

Figure 3:
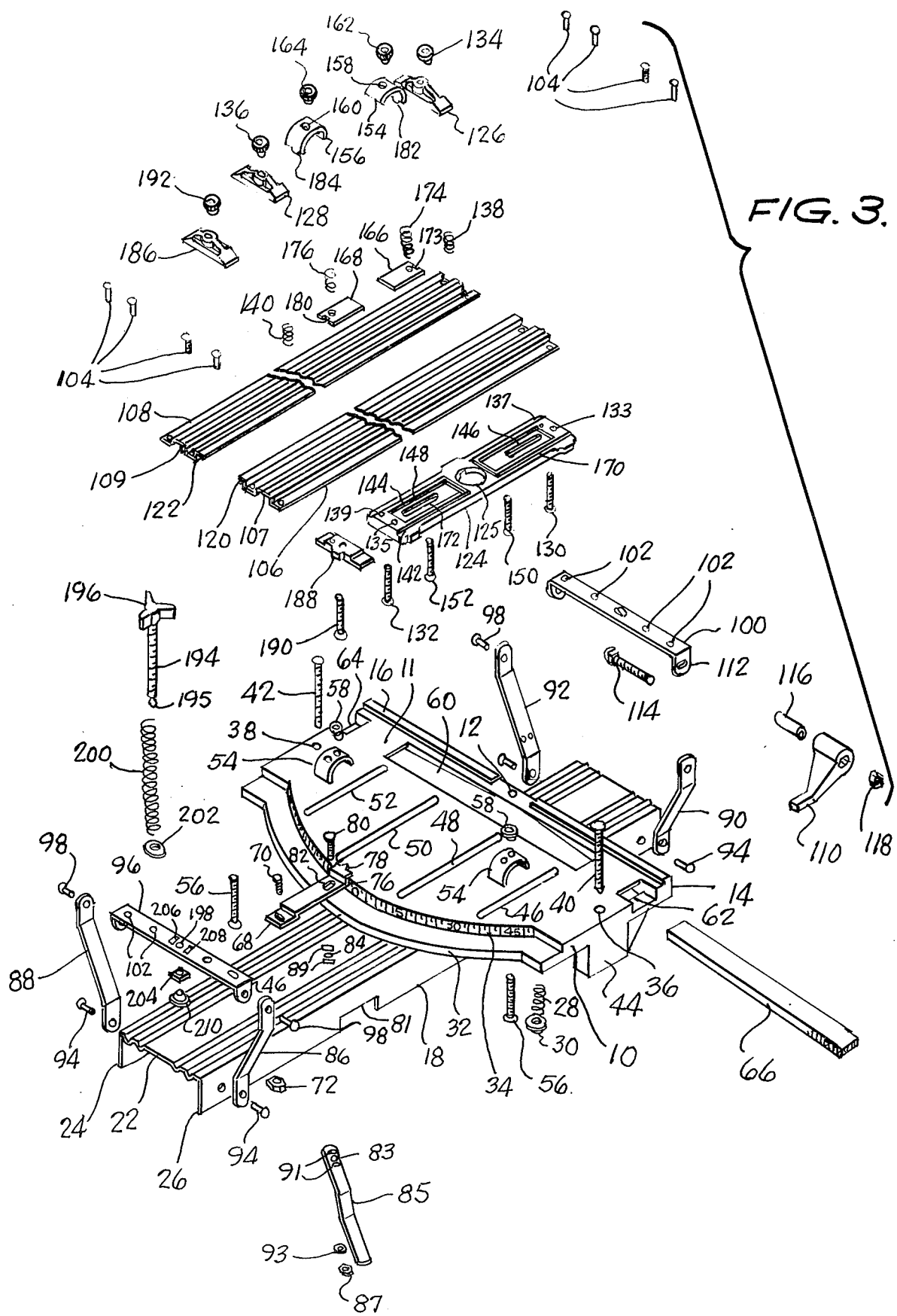
FIG. 3 is an exploded, perspective view illustrating all of the components of the preferred embodiment of the present invention illustrated in FIG. 2.

Referring now to FIG. 3, there is illustrated an exploded view showing all of the components which comprise the router 225 of the preferred embodiment of the present invention. The accessory includes a table 10 which is preferably constructed of styrene plastic and includes a substantially planar upper surface 11 upon which the workpiece is adapted to be received. The table 10 is made rotatable about a pivot pin 12 which extends below the upper surface 11, as seen more clearly in FIG. 5. The rear edge 14 of table 10 preferably includes an upstanding flange 16 extending along the entire width of table 10 and against which the workpiece may be positioned for more accurate cutting.

The accessory of the present invention also includes a generally U-shaped elongated lower channel support member 18. Support member 18 includes a horizontal portion 22 which connects a pair of parallel, longitudinally extending legs 24 and 26 which support the member 18 off the workbench. Formed in the horizontal portion 22 of support member 18 is an aperture 20 for pivotably receiving pin 12 of table 10, as illustrated in FIGS. 5 and 6 in exploded and assembled views, respectively. Pin 12 is secured underneath the horizontal portion 22 by a spring 28 and a lock washer 30 so that table 10 is pivotable thereabout. Referring back to FIG. 3, table 10 includes an arcuate front lip 32 whose outer edge is positioned equidistantly from the pivot pin 12.

An upstanding ledge 34 is formed just inwardly of the arcuate front lip 32 and preferably has angle indicia formed thereon for indicating the angle of orientation of the table 10 with respect to the longitudinal axis of support member 18.

Adjacent the lateral side edges of table 10 are positioned a pair of apertures 36 and 38 for respectively receiving a pair of wood screws 40 and 42 which are adapted to secure the table 10 to a workbench. A spacer 44 is provided on each side of table 10 to provide a guide and support for the mounting screw 40 as well as the table 10.

Formed perpendicularly to the rear edge 14 of table 10 are a plurality of elongated through slots 46, 48, 50 and 52 which are adapted to receive, for example, workpiece clamps 54 which have apertures for receiving bolts 56 mounted from the underside of table 10 and secured by nuts 58. The workpiece clamps 54 clearly may be laterally positioned in any of the slots 46, 48, 50 and 52 as may be necessary to accommodate the desired width and length of workpiece, as will become more clear hereinafter.

Located parallel to the rear edge 14 of table 10 is a guideway or channel 60 which is inclined from a maximum height at the center of table 10 (in front of pivot pin 12) downwardly to form a pair of slots 62 and 64 on each lateral side of table 10. Slots 62 and 64 are each adapted to receive a safety stick 66 which may be utilized for a purpose to be described in greater detail hereinafter.

Reference numeral 68 indicates a clamp for securing the table 10 against pivotal rotation. Clamp 68 is secured to the horizontal portion 22 of support member 18 via a locking screw 70 which is placed through an aperture 74 formed in portion 22 and is secured by a nut 72 on the underside of support 18. Clamp 68 includes a forwardly positioned L-shaped flange 76 which is adapted to fit over the arcuate lip 32. Flange 76 preferably includes a pointed tip 78 for facilitating alignment with the indicia on ledge 34.

For facilitating the clamping and unclamping of the table 10 by clamp 68, there is provided a bolt 80 which is fitted through an aperture 82 in clamp 68, an aperture 84 in support 18, and an aperture 83 in a pivot arm 85. Bolt 80 is finally secured by a nut 87 and a spring washer 93. Pivot arm 85, which is secured to the underside of member 18, extends through a cutout 81 in the side leg 26 of support 18 for facilitating manual grasping thereof. Positioned adjacent both sides of aperture 83 in pivot arm 85 are a pair of upwardly extending projections 91 which are adapted to cooperate with a pair of downwardly extending projections 89 formed on opposite sides of aperture 84 in horizontal portion 22 of support 18. When projections 91 and 89 are aligned with one another, the effect is to lower the flange 76 of clamp 68 into tight engagement with the arcuate edge 32 of table 10. When handle 85 is pushed forwardly, projections 89 and 91 become disengaged, and the action of spring washer 93 raises the flange 76 to permit table 10 to be rotated relative to support member 18, or vice versa.

The preferred embodiment of the present invention illustrated in FIG. 3 also includes four brackets 86, 88, 90 and 92 which are pivotally secured through holes formed in the respective ends of legs 24 and 26 of support member 18 by means of, for example, pivot rivets 94. Pivot brackets 86, 88, 90 and 92 are angled so that their upper portions are more widely spaced than their lower portions.

A guide bar bracket 96 is pivotally secured between the upper ends of brackets 86 and 88 via pivot rivets 98, while another bracket 100 is pivotally secured between the upper ends of brackets 90 and 92 via rivets 98.

Brackets 96 and 100 each include a horizontal, planar portion having a plurality of apertures 102 formed therethrough for receiving a plurality of rivets 104 which secure a pair of parallel router guide bars 106 and 108 to the brackets 96 and 100. Each of the router guide bars 106 and 108 includes a raised channel 107 and 109, respectively, along which the router may be supported, as will become more clear hereinafter.

The router guide bars 106 and 108 may be raised and lowered vis-a-vis the lower channel support member 18 by means of a handle 110 which is preferably lockingly secured to a square aperture 112 formed in one flange of the bracket 100. A lock bolt 114 having a square shoulder cooperates with the aperture 112, a spacer 116, and a nut 118 to secure handle 110 in the desired position.

The guide bars 106 and 108 include a pair of inwardly extending horizontal flanges 120 and 122, respectively, along which a router support 124 is mounted for sliding movement along flanges 120 and 122, if desired.

In the center of router support 124 is located a hole 125 through which the router bit extends to the workpiece positioned on table 10 therebelow. Acting as means for connecting the support 124 to the flanges 120 and 122 of bars 106 and 108 are a pair of router support clamps 126 and 128 which are adjustably retained on the respective ends of router support 124 via mounting apertures 133 and 135, respectively. A pair of screws 130 and 132 extend upwardly from the underside of support 124 through apertures 133 and 135, respectively. Screws 130 and 132 preferably have square heads which are retained within appropriately sized channels (not shown) on the underside of support 124 to prevent rotation thereof once secured.

Screws 130 and 132 extend through clamps 126 and 128 and are secured by a pair of thumbscrew nuts 134 and 136. Preferably, a pair of springs 138 and 140 extend within generally cylindrical recesses (not shown) formed on the underside of clamps 126 and 128.

The router support 124 has formed laterally along both edges thereof a pair of ledges 142 and 144 which are positioned in use below the horizontal flanges 120 and 122 of bars 106 and 108 and are held in place by clamps 126 and 128 whose ends are positioned in use over the flanges 120 and 122.

On the underside of each of the clamps 126 and 128 may be formed a small, cylindrical projection (not shown) for fitting within holes 137 and 139 on router support 124 to prevent pivoting of the clamps 126 and 128, respectively.

Also formed in the router support 124 are a pair of longitudinal slots 146 and 148 which are adapted to receive a pair of square-headed bolts 150 and 152 from below. Formed on the lower surface of support 124 are channel means (not shown) for receiving the square head of bolts 150 and 152 to prevent rotation thereof. Bolts 150 and 152 receive a pair of router clamps 154 and 156, respectively, via apertures 158 and 160 formed therein. A pair of thumbscrew nuts 162 and 164 secure the upper ends of bolts 150 and 152.

A pair of planar clamp shoes 166 and 168 are secured between the router clamps 154 and 156 and the router support 124 and are sized so as to be received within a pair of depressions 170 and 172 formed in support 124. The router clamps 154 and 156 are preferably spring-loaded with respect to the shoes 166 and 168 via springs 174 and 176 placed about bolts 150 and 152. At the rear of each of the clamp shoes 166 and 168 is formed a cutout 178 and 180 for receiving the tabs 182 and 184 respectively located on the lower ends of clamps 154 and 156.

An additional, separate slide shoe clamp 186 is provided for repeat cuts and fits similarly over the flanges 120 and 122 of bars 106 and 108. Clamp 186 serves to stop the sliding movement of the router, as will become more clear hereinafter. A slide stop member 188 is positioned under the flanges 120 and 122, and a bolt 190 cooperates with thumbscrew nut 192 to secure the clamp 186 and stop 188 together.

The preferred embodiment of the present invention also includes a height adjusting assembly for limiting the height to which the guide rails 106 and 108 may be lowered with respect to the lower elongated support member 18. More particularly, still with reference to FIG. 3, the height adjusting assembly includes an elongated screw 194 having a handle 196 positioned at one end thereof and a nipple-like projection 195 positioned at the other end thereof. Screw 194 extends through an aperture 198 centrally formed in guide bracket 96. A spring 200 is preferably positioned about the screw 194 and is held above bracket 96 by means of a washer 202.

A nut 204 is positioned underneath bracket 96 and may be threadingly secured to the portion of screw 194 which extends below bracket 96 through aperture 198. The degree to which the nut 204 is rotated onto screw 194 determines the extent to which screw 194 will be positioned below bracket 96. Nut 204 is held from rotation by means of a pair of downwardly projecting depressions 206 and 208 formed in bracket 96.

A plastic, flat bottomed button 210 includes a central aperture which is adapted to be snap fit into the nipple 195 of screw 194. The flat bottomed surface of button 210 is adapted to engage the horizontal portion 22 of lower channel support member 18 so as to limit the lower movement of the upper pair of parallel guide rails 106 and 108.

Referring now to FIG. 2, the router accessory 225 of the present invention is illustrated in a completely assembled condition, but for the workpiece and the router. The router guide bars 106 and 108 are illustrated in a raised relationship to the lower support member 18, and the router support 124 has been installed between flanges 120 and 122 of guide bars 106 and 108. The table 10 has been secured to the support 18 by pivot pin 12 as well as by securing clamp 68 so that pointer 78 is directed towards the "0°" marker on flange 34. Prior to mounting the router and workpiece, the accessory 225 should be firmly secured to a workbench by means of apertures 36 and 38 in table 10 and associated screws 40 and 42.

To install the router, the thumbscrew nuts 162 and 164 are loosened, and the flanged router base is mounted on top of the clamp shoes 166 and 168, as well as on the guide bars 106 and 108. The router spindle is centered through hole 125, and the thumb nuts 162 and 164 are then tightened.

Referring now to FIG. 1, reference numeral 212 indicates generally a conventional electric router having a power cord 214, a motor housing 215, a pair of handles 216 and 218, and a lower rim flange 220 which has been secured to the router support 124 via clamp 154 (not shown) and clamp 156.

Initially, the workpiece 222 is placed on the table 10 under the guide bars 106 and 108, and the lock nut 204 is loosened to permit the bars 106 and 108 to be lowered by knob 110 until they are just touching the workpiece 222. Handle 196 of screw 194 is then rotated until button 210 contacts the horizontal surface 22 of lower support 18, whereafter lock nut 204 secures screw 194 in position.

In the mode of operation illustrated in FIG. 1, the table 10 has been rotated to the desired angular position, and the lever 85 has secured clamp 68 to lock table 10 as shown. Further, clamps 54 clamp the workpiece 222 to the table 10 via slots 46 and 48 and associated hardware, including thumbscrews 58. In this mode of operation, which is designed to trim the ends of short workpieces, make joints or angle cuts, or the like, the router support clamps 126 and 128 are loosened slightly via thumbscrews 134 and 136 to permit the router support 124 to slide longitudinally along flanges 120 and 122. The router 212 may then be pulled via handles 216 and 218 across the workpiece 222 to make the desired cut. The guide bars 106 and 108 guide the router 212 and keep the workpiece 222 on the table 10. The stop clamp 186 may be positioned as desired along flanges 120 and 122 to permit repeat cuts. Accordingly, in this mode of operation, the workpiece 222 is securely clamped, and the router 212 is moved.

Referring now to FIG. 4, an alternate mode of using the present invention is illustrated. In this mode of operation, the router 212 is clamped by securing support clamps 126 and 128 tightly against flanges 120 and 122, and the workpiece 222 is pushed through the router bit (not shown) by means of the safety stick 66 which is inserted into one of the side slots, such as slot 62, so that the end 67 thereof pushes the workpiece 222, as illustrated. In this mode of operation, the depth of the guide bars 106 and 108, as set by depth adjustment screw 194, should be such so as to permit the workpiece 222 to be slid easily thereunder with only slight drag. The depth of the cut in the workpiece 222 may be adjusted by using the depth adjustment on the router 212. The workpiece 222 may be positioned the desired distance from the rear flange 16 of workpiece 10 to achieve the desired cut, as will be apparent to a person of ordinary skill in the art.

Obviously, numerous modifications and variations of the present invention are possible in light of the above teachings. It is therefore to be understood that within the scope of the appended claims, the invention may be practiced otherwise than as specifically described herein.

I claim as my invention:

1. An accessory for an electric router, which comprises:
   first means for supporting a workpiece to be cut by said router;
   second means for supporting said router and positioned over said first means;
   means for adjusting the height of said second means relative to said first means;
   wherein said first means includes an elongated support member, said second means includes guide rail means and said height adjusting means includes means for maintaining said guide rail means substantially parallel to said elongated support member at all heights thereof;
   wherein said height adjusting means further includes means for limiting the height to which said guide rail means may be lowered with respect to said elongated support member; and
   wherein said height limiting means comprises a stop member coupled to and extending below said guide rail means a distance corresponding to the desired height limit.

2. The router accessory as set forth in claim 1, wherein said height adjusting means comprises bracket means pivotally interconnected between said elongated support member and said guide rail means.

3. The router accessory as set forth in claim 1, wherein said guide rail means comprises a pair of elongated, spaced, parallel guide rails which extend in a direction parallel to said elongated support member.

4. The router accessory as set forth in claim 2, wherein said bracket means comprises four elongated brackets each of which is pivotally mounted at one end thereof to said elongated support member and at the other end thereof to said guide rail means.

5. The router accessory as set forth in claim 3, wherein said guide rail means further comprises means for mounting said router vertically thereon and having means for permitting passage of the bit of said router between said rails to a workpiece positioned on said support member therebelow.

6. The router accessory as set forth in claim 5, wherein said means for mounting said router includes means for permitting sliding movement of said router along said guide rails.

7. The router accessory as set forth in claim 6, wherein said means for mounting said router includes means for clamping the flanged base of said router thereto.

8. The router accessory as set forth in claim 7, wherein said means for permitting sliding movement comprises a pair of adjustable clamping means located respectively at each end of said mounting means.

9. The router accessory as set forth in claim 8, wherein said pair of guide rails include inwardly extending parallel flanges to which said pair of adjustable clamping means are mounted for selective sliding movement therealong.

10. The router accessory as set forth in claim 4, further comprising handle means connected to one of said other ends of said brackets for facilitating movement of said guide rails means relative to said elongated support member.

11. The router accessory as set forth in claim 1, wherein said stop member comprises a threaded bolt and a lock nut for permitting adjustment of the portion thereof which extends below said guide rail means.

12. The router accessory as set forth in claim 1, further comprising an additional clamping means placed between said parallel flanges for serving as a stop means for said sliding movement of said router.

13. The router accessory of claim 1, further comprising clamp means connected to said support member for clamping said table means in a fixed position to prevent rotation thereof, and lever means coupled to said clamp means for selectively raising and lowering the same respectively out of and into engagement with a table means pivotally mounted to said support member.

14. The router accessory as set forth in claim 13, wherein said table means includes a pivot pin and an arcuate edge equidistantly located from said pivot pin, said clamp means including means for selectively engaging said arcuate edge.

15. An accessory for an electric router, which comprises:
- first means for supporting a workpiece to be cut by said router;
- second means for supporting said router and positioned over said first means;
- means for adjusting the height of said second means relative to said first means;
- wherein said first means comprises a support member and table means pivotally mounted to said support member for rotation thereof in a substantially horizontal plane; and
- wherein said table means includes a substantially planar upper surface upon which said workpiece is adapted to be placed and slotted means formed therein for receiving safety means adapted to manually push said workpiece across said surface.

16. The router accessory as set forth in claim 15, and further comprising means adapted to secure said table means to a workbench therebelow.

17. The router accessory as set forth in claim 15, wherein said planar upper surface includes slot means formed therein for receiving means for clamping said workpiece thereon.

18. The router accessory as set forth in claim 15, further comprising a ledge formed along the rear edge of said table means against which said workpiece may be positioned.

19. The router accessory as set forth in claim 15, wherein said safety means comprises an elongated stick.

20. The router accessory as set forth in claim 15, wherein said slotted means is substantially parallel to the rear edge of said table means and is also inclined from its highest point at the center thereof downwardly to each of the side portions of said table means.

* * * * *